United States Patent [19]

Chadwick

[11] Patent Number: 4,481,930
[45] Date of Patent: Nov. 13, 1984

[54] FUEL INLET REPAIR DEVICE

[76] Inventor: Joseph D. Chadwick, 2327 English Ave., Indianapolis, Ind. 46201

[21] Appl. No.: 468,310

[22] Filed: Feb. 22, 1983

[51] Int. Cl.³ .............................................. F16L 5/00
[52] U.S. Cl. .................................... 123/495; 285/162
[58] Field of Search ................ 123/445, 495; 285/162, 285/196, 338, 346; 261/34 A, 72 R

[56] References Cited
U.S. PATENT DOCUMENTS

| | | | |
|---|---|---|---|
| 3,058,760 | 10/1962 | Bankowski | 285/196 |
| 3,434,746 | 3/1969 | Watts | 285/162 |
| 3,677,578 | 7/1972 | Roos | 285/162 |
| 3,768,839 | 10/1973 | Thompson | 285/338 |
| 4,003,835 | 1/1977 | Johnson | 210/463 |

Primary Examiner—William A. Cuchlinski, Jr.
Attorney, Agent, or Firm—Wallace E. Weakley

[57] ABSTRACT

A fuel inlet repair device for repairing the damaged threaded fuel inlet opening of an engine carburetor or fuel injection pump to allow the fuel inlet line to be connected to the fuel inlet opening. The fuel inlet repair device according to the present invention consists of a generally tubular shaped outer plug or member formed of a plastic material impervious to fuel and having an outer diameter corresponding generally to the size of the opening of the fuel inlet passage in the carburetor or fuel injector pump. The tubular shaped member has a tapered opening passing longitudinally therethrough, with threads formed along the tapered bore or opening. An inner plug having threads on the outer surface thereof corresponding to the tapered threads on the inner opening or passage through the outer tubular plug is designed to be inserted into the threaded opening. The inner threaded plug member also has an opening longitudinally therethrough, with one end of said opening being formed in a hexagon shape or a shape generally corresponding to an installation tool for threading the inner plug into the threaded opening in the outer tubular shaped plug member. The outer tubular shaped plug member is inserted into the carburetor fuel inlet opening and the inner plug is then threaded into the threads in the tapered threaded bore through the outer plug. As the inner plug is threaded further into the tapered bore in the outer plug, the outer surface of the outer plug is caused to expand into engagement with the damaged threads and inner surface in the carburetor fuel inlet opening in such a manner as to seal the space between the outer surface of the outer plug and the inner bore of the carburetor fuel inlet opening. The fuel inlet line is then connected to the threads in the bore in the outer plug, resulting in a sealed connection between the fuel inlet line and the carburetor fuel inlet opening.

5 Claims, 6 Drawing Figures

FUEL INLET REPAIR DEVICE

BACKGROUND OF THE INVENTION

1. Field of the Invention

The present invention relates to a device for repairing the fuel inlet opening connection of a carburetor, fuel injection pump or other similar device, and, more specifically, to a two piece repair device formed of a suitable plactic material designed to be inserted into the damaged threads of the fuel inlet opening of a carburetor or fuel injection pump to enable the fuel inlet line to be reconnected to the carburetor or fuel injection pump without requiring major machining operations to be carried out on the damaged fuel inlet opening.

2. Description of the Prior Art

One of the most common problems and most difficult problems to be repaired in the automotive industry is damaged fuel line inlets in engine carburetors and fuel injection devices. Many times, when engine carburetors or fuel injection pumps are repaired or rebuilt, the internal threaded opening becomes damaged which then makes it difficult to reconnect the fuel inlet line to the carburetor or fuel injection pump inlet opening without a constant leak which would result in a very dangerous situation. Many times the only way to repair a damaged fuel inlet opening in a carburetor or fuel injection pump in by costly machining operations to rebore and re-thread the fuel inlet opening. This method of repair is not only costly but very time consumming.

Other devices and methods for repairing damaged fuel inlet openings have been proposed, but none have proven entirely satisfactory. Such prior art methods and devices for repairing of various types of metals. Some of these fuel inlet repair fittings incorporate coarse threads on the external surface to actually recut threads in the damaged fuel inlet opening. However, these devices generally begin leaking within a short period of time after use.

Another type of fuel inlet repair fitting utilizes O-rings on a tapered body in an effort to obtain a suitable repair seal with the fuel inlet opening. Again, these generally do not result in a suitable and satisfactory repair and generally begin leaking within a short period of time.

SUMMARY OF THE INVENTION

The present invention seeks to eliminate many of the problems which result from the use of the prior art fuel inlet opening repair devices, including the primary problem of leakage, by presenting a device constructed in a unique manner from a pliable plastic material constructed in such a manner as to expand into and engage the damaged internal threads in the fuel inlet opening to achieve a resulting seal which is leakproof and long lasting.

Another advantage of the present invention over the prior art devices is to present a unique fuel inlet opening repair device that is inexpensive and easily installed in a damaged fuel inlet opening.

A further advantage of the present invention is the incorporation of a unique expansion design utilizing a threaded plug to cause the inlet repair device to be expanded into leak-proof engagement with the damaged threads and internal surface of the fuel inlet opening to result in a long lasting, leakproof repair.

These and other advantages and objects will be more readily seen when reading the specification in view of the drawings accompanying this application and forming a part thereof.

DESCRIPTION OF THE PREFERRED EMBODIMENTS

The preferred embodiments of the present invention will now be described with reference to the accompanying Drawing and Figures.

Figure 1:
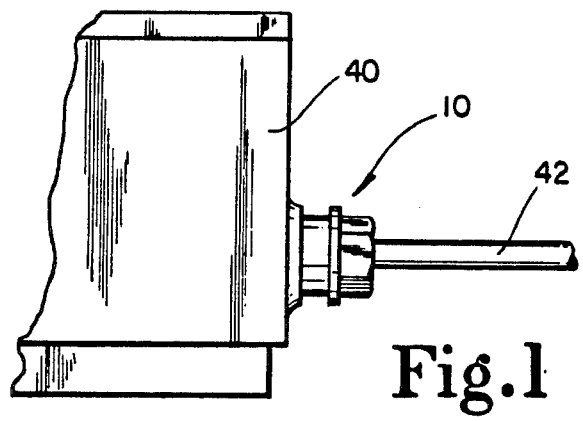
FIG. 1 is a side assembly view showing the present invention installed in a carburetor fuel inlet with a fuel line connected thereto.

Referring to FIG. 1, the fuel inlet assembly 10 is shown installed between the fuel inlet opening of a carburetor or fuel injector fuel inlet housing 40 and a fuel inlet line or fluid transfer line 42 to repair a leaking fuel or fluid inlet into the carburetor or fuel injection housing 40.

Figure 3:
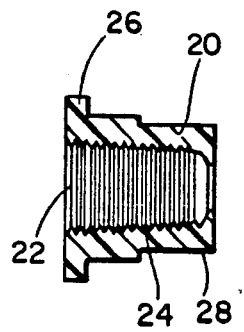
FIG. 3 is a longitudinal sectional view of the outer plug portion of the subject invention.
Figure 2:
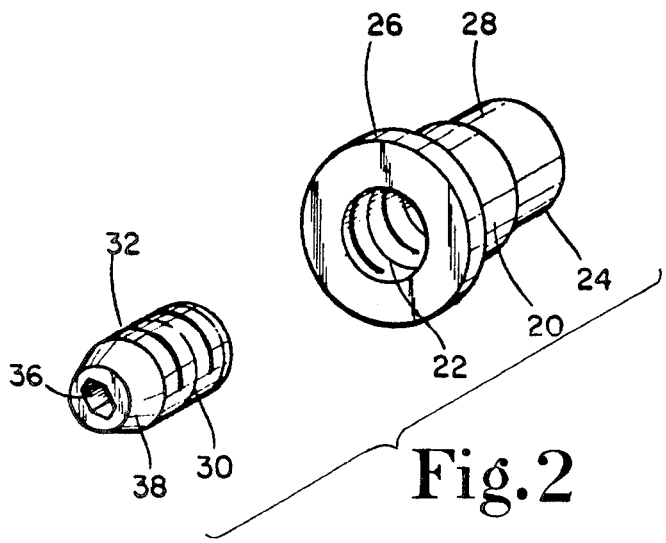
FIG. 2 is an exploded persepctive view showing the manner in which the present invention is assembled.

The specific details of the construction of the fuel inlet repair assembly 10 will now be described with reference to FIGS. 2 through 6. The fuel inlet repair assembly 10 according to the present invention is comprised of an outer tubular shaped member or plug 20, having an internally threaded bore or opening 22 there through as seen in FIGS. 2 and 3. The outer tubular member or plug 20 is constructed of a fuel impervious plastic material having an outside surface or stepped shoulder shown at 24. The outer stepped shoulder 24 is of a diameter corresponding generally to the diameter of the fuel inlet opening in a carburetor or fuel injector assembly 40.

Referring specifically to FIGS. 2 and 3, the outer tubular member or plug 20 of the present invention is formed with a sealing surface 28 extending from the outer stepped shoulder 24 for engagement with the internal threads in the threaded opening of the fuel inlet of the carburetor or fuel injector pump 40.

As seen specifically in FIG. 3, the threaded bore or opening 22 through the outer plug 20 has tapered threads 22 formed thereon, which threads are of a tapered pipe thread configuration.

Figure 5:
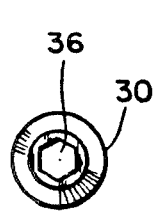
FIG. 5 is an end view of FIG. 4 showing the hexagonal shaped opening in the end of the inner threaded plug.
Figure 4:
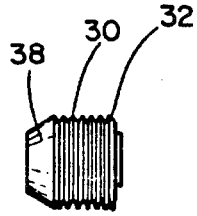
FIG. 4 is a side view of the inner threaded plug of the subject invention.
Figure 6:
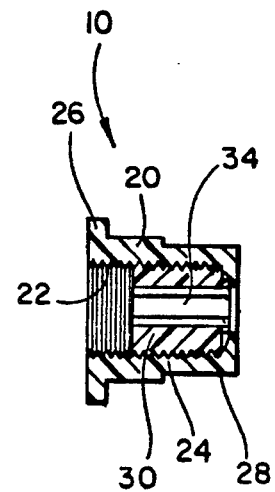
FIG. 6 is a longitudinal section view of the present invention showing the threaded inner plug assembled within the tapered threaded passage of the outer plug.

The inner threaded plug of the fuel inlet repair assembly 10 is shown generally at 30 in FIGS. 2 and 6. The details of the inner threaded plug 30 will now be described with reference to FIGS. 2, 4, 5 and 6. Referring specifically to FIG. 4, the inner threaded plug member 30 is of a general size and configuration to be inserted into the threaded bore or opening 22 of the outer plug member 20. The inner threaded plug 30 has threads formed on the outer surface thereof as shown at 32. The outer threads 32 on the outer surface of the inner threaded plug 30 correspond to the tapered threads 22 formed in the bore through the outer plug 20.

The inner threaded plug 30 has a passageway or bore therethrough, as may be seen in detail in the cross-sectional assembly view of FIG. 6, to allow liquid to flow through the assembled inlet repair device 10.

As shown in FIGS. 2 and 5, one end of the bore 34 has a hexagon shaped opening 36 to allow the insertion of a hexagon shaped wrench commonly known as an allen wrench for threading the inner threaded plug 30 into the threaded bore or opening 22 of the outer plug 20. The end of the inner threaded plug having the hexagon shaped opening 36 formed therein also has a tapered outer surface 38 to form a seat or a flange usually formed on the end of a fuel inlet line 42.

The operation of the present invention and its use in repairing the fuel opening inlet of a carburetor or fuel injection pump 40 will now be described with reference to FIGS. 2 and 3. In order to use the structure according to the present invention to repair a leaking fuel inlet opening of a carburetor or fuel injection pump 40, the fuel line 42 is first disconnected from the threaded inlet opening. The fuel inlet repair assembly 10 according to the present invention comprising the outer plug member 20 having the inner threaded plug 30 partially threaded into the large diameter threaded opening, is inserted into the fuel inlet opening of the carburetor or fuel injector pump 40 until the stepped shoulder 24 engages the outer surface or end of the fuel inlet opening to prevent the repair assembly 10 from being inserted completely into the fuel inlet opening of the carburetor or fuel injector pump 40. The flange 26 on the end of the outer plug 20 extending away from the carburetor or fuel injector pump 40 is then gripped by the operator to prevent rotation of the outer plug 20. The operator then inserts a hexagon shaped wrench, commonly known as an Allen Wrench, into the hexagon shaped opening 36 of the inner threaded plug 30, and rotates the Allen Wrench to cause the inner threaded plug 30 to be threaded into the threaded bore or opening 22 within the outer plug 20. The engagement of the threads 32 on the inner threaded plug 30 with the tapered threaded bore or opening 22 within the outer plug 20 as the inner threaded plug 30 is threaded further into the outer plug 20 causes the outer sealing surface 28 of the outer plug 20 to become tightly engaged with the threaded bore of the fuel inlet opening of the carburetor or fuel injection pump 40.

The operator then tightens the inner threaded plug 30 in the threaded bore 22 of the outer plug 20 to cause the outer sealing surface 28 to retain the inlet repair assembly 10 within the fuel inlet opening of the carburetor or fuel injector pump 40 in such a manner as to create a seal between the outer sealing surface 28 of the inlet repair assembly 10 and the inner surface of the fuel inlet opening of the carburetor or fuel injector pump 40.

The operator then reattaches the fitting on the end of the fuel inlet line 42 into the threaded bore 22 of the outer plug 20 and tightens the flange to cause the flanged end of the fuel inlet line 42 to seal against the tapered seat 38 on the inner threaded plug 30.

The assembly of the fuel inlet repair assembly 10 of the subject invention in a carburetor or fuel injector pump inlet line takes only a matter of minutes and provided a permanent, leak-proof repair of a fluid inlet opening or connection between a fuel inlet line 42 and a carburetor or fuel injector pump body 40 as shown in FIG. 1.

Although the structure and assembly of the preferred embodiment of the subject invention is described with reference for use to repair the fuel inlet opening of a carburetor or fuel injector pump the scope of the present invention is not limited to such use, but may be used to repair any type of fluid inlet or passage opening utilizing the type of connections contemplated by the structure of the present invention.

Having described the details of the preferred embodiments of the present invention, what is claimed is:

1. A fuel inlet device for repairing damaged threaded fuel inlet openings of an engine carburetor or fuel injection pump comprising a generally tubular shaped outer member formed of a pliable fuel impervious material, said tubular shaped outer member having a tapered opening longitudinally therethrough; an inner tubular shaped plug member having an outer diameter corresponding generally to the mean diameter of the tapered opening in the outer member, said inner tubualr shaped member having an opening longitudinally therethrough; said inner tubular member having means for engaging the surface of the tapered bore of said outer tubular shaped member and causing said tubular shaped outer member to expand radially outwardly when said inner tubular member is forced into said tapered bore to cause the outer surface of said tapered bore to cause the outer surface of said outer tubular member to contact the bore of a fuel inlet opening of an engine carburetor or fuel injection pump and form a fluid tight seal; and means for connecting a fuel inlet line to the tapered bore of said outer tubular member, whereby a fluid tight connection is made between a fuel inlet line and an engine carburetor or fuel injection pump.

2. A fuel inlet repair device as recited in claim 1, wherein said tapered inner bore of said outer tubular shaped member has threads formed there along, and the outer surface of said inner tubular member has threads formed thereon and adapted to engage said threads on said tapered inner bore of said outer tubular member, whereby said tubular inner member is adapted to be threaded into said tapered bore to cause the outer surface of said outer tubular member to be expanded radially outwardly as said inner tubular member is threaded into said tapered bore to cause the outer surface of said outer tubular member to sealingly engage the bore of a fuel inlet opening of an engine carburetor or fuel injection pump.

3. A fuel inlet repair device as set forth in claim 2, wherein one end of the longitudinal opening passing through said inner tubular member has a hexagonal shape thereto, whereby said inner tubular member may be rotated by inserted a hexagonal shaped wrench into said opening to thread said tubular member into said tapered bore of said outer tubular member.

4. A fuel inlet repair device as set forth in claim 2, wherein the end surface of said inner tubular member facing away from the fuel inlet opening has a surface formed corresponding to the mating surface of a fuel inlet line to sealingly engage said fuel inlet line.

5. A fuel inlet repair device as set forth in claim 2, wherein said outer tubular member has a stepped shoulder formed on the outer surface thereof for holding said outer tubular member while threading said inner tubular member into said tapered bore.

* * * * *